United States Patent [19]

Hsu

[11] Patent Number: 4,994,724
[45] Date of Patent: Feb. 19, 1991

[54] SERVO-CONTROLLED AUTOMATIC DOOR HAVING AUTOMATIC DETECTING AND ADJUSTING MECHANISM

[76] Inventor: Chun-Pu Hsu, P.O. Box 10160, Taipei, Taiwan

[21] Appl. No.: 501,011

[22] Filed: Mar. 29, 1990

[51] Int. Cl.⁵ .......................................... G05B 19/28
[52] U.S. Cl. ................................. 318/603; 318/283; 318/602; 318/640; 318/468; 318/282
[58] Field of Search ............... 318/280–293, 318/462–469, 560–640, 266–279; 49/25, 280, 360, 358, 357; 250/221; 340/555, 556, 557

[56] References Cited

U.S. PATENT DOCUMENTS

| | | | |
|---|---|---|---|
| 4,090,113 | 5/1978 | Ogishi | 318/282 |
| 4,145,641 | 3/1979 | Ozaki | 318/282 X |
| 4,234,833 | 11/1980 | Barrett | 318/282 |
| 4,313,281 | 2/1982 | Richmond | 49/280 X |
| 4,319,169 | 3/1982 | Kucharczyk | 318/282 X |
| 4,338,553 | 7/1982 | Scott, Jr. | 318/266 |
| 4,529,920 | 7/1985 | Yoshida et al. | 318/468 X |
| 4,563,625 | 1/1986 | Kornbrekke et al. | 318/283 X |
| 4,673,848 | 5/1987 | Hagiwara et al. | 318/468 X |
| 4,697,383 | 10/1987 | Hagiwara | 49/25 |
| 4,736,144 | 4/1988 | Chun-Pu | 318/469 X |
| 4,893,435 | 1/1990 | Shalit | 49/280 X |

Primary Examiner—Paul Ip

[57] ABSTRACT

An automatic door includes a control program microprocessed in commensuration with the requirements of a servo-controlled control network of an automatic door and recorded in a read only memory (ROM), whereby upon an initiation by an electric current, a central processing unit (CPU) will give series of instructions to automatically sense the location of the automatic door and will calculate the errors after finishing each operating cycle of the moving door for re-setting the positioning point for each operation mode of a next door movement, and will always monitor the running speed of a motor for driving the door to be compared with a pre-determined value memoried in the ROM so as to exert a warning alarm and to temporarily stop or finally stop a door for safety purpose.

1 Claim, 5 Drawing Sheets

SERVO-CONTROLLED AUTOMATIC DOOR HAVING AUTOMATIC DETECTING AND ADJUSTING MECHANISM

BACKGROUND OF THE INVENTION

U.S. Pat. No. 4,736,144 disclosed by the same inventor of this application includes an automatic door which is driven by a motor and speed sensor and is controlled by a servo-controlled safety protection device. However, the servo-controlled protection circuit requires more labors for the assembly, test and inspection when producing the control circuit and may increase operation and maintenance problem when used.

Even Yoshida, et. al disclosed a control apparatus for an automatic door with a minimum error in a detected door position in their U.S. Pat. No. 4,529,920 including a main control 12 having a door position measuring means 23, a state sequencer 24, a door stroke setter 25, two channels for handling opening and closing modes of operations and a gate circuit 29. Such a complex circuit may still increase operation and maintenance problems.

It is therefore expected to invent an automatic door including a software of microprocessing control program in cooperation with a servo-control network for automatically controlling an automatic door.

SUMMARY OF THE INVENTION

The object of the present invention is to provide an automatic door including a control program microprocessed in commensuration with the requirements of a servo-controlled control network of an automatic door and recorded in a read only memory (ROM), whereby upon an initiation by an electric current, a central processing unit (CPU) will give series of instructions to automatically sense the location of the automatic door and will calculate the errors after finishing each operating cycle of the moving door for re-setting the positioning pint for each operation mode of a next door movement, and will always monitor the running speed of a motor for driving the door to be compared with a predetermined value memorized in the ROM so as to exert a warning alarm and to temporarily stop or finally stop a door for safety purpose.

DETAILED DESCRIPTION

Figure 1:
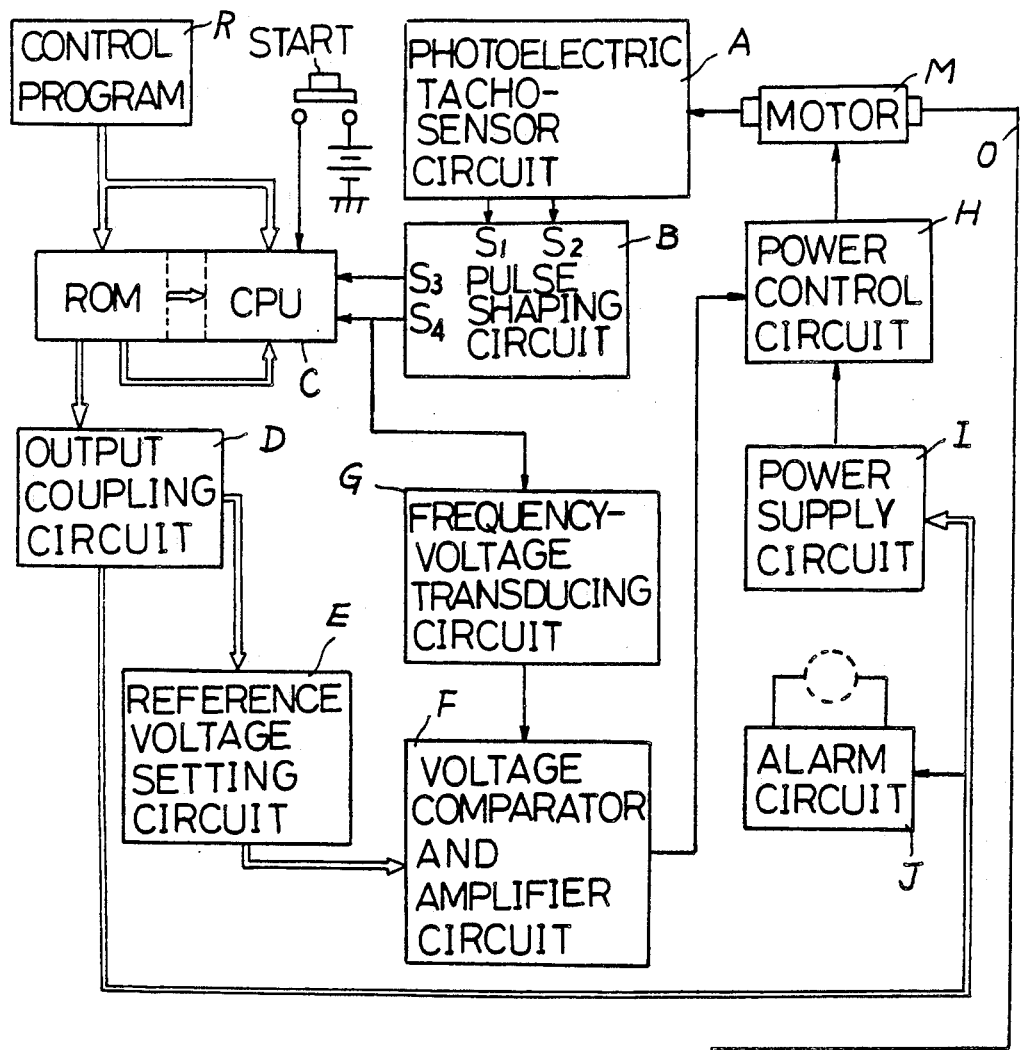
FIG. 1 is a block diagram of an overall circuit of the present invention.
Figure 1:
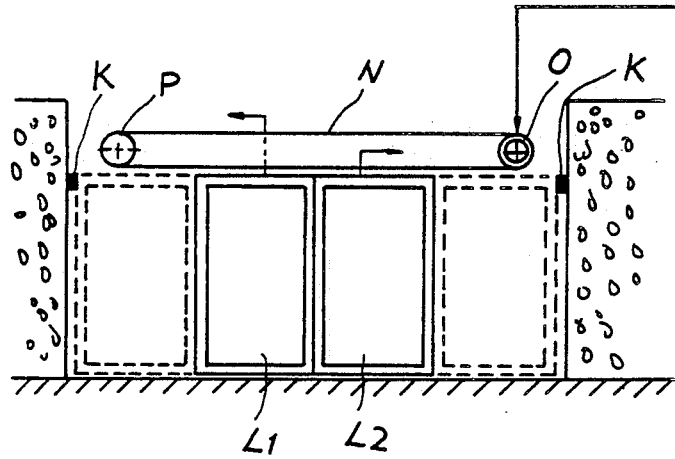
Figure 2:
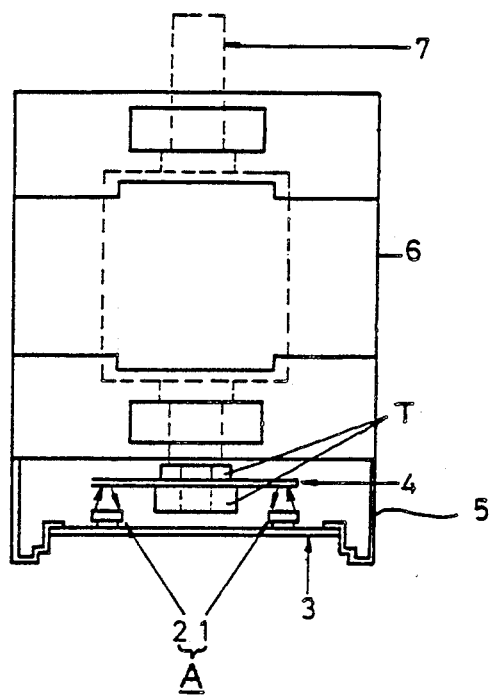
FIG. 2 shows an apparatus of a motor, sensing rotating disc and a pulse rectifying circuit board of the present invention.
Figure 2A:
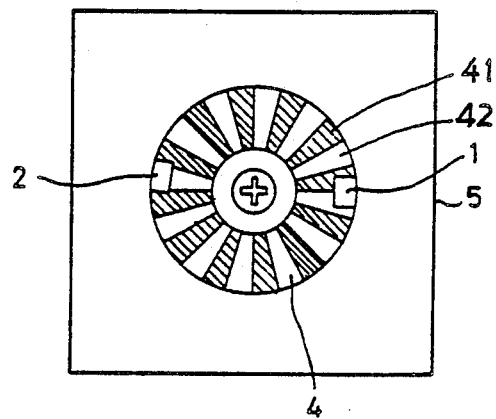
Figure 6:
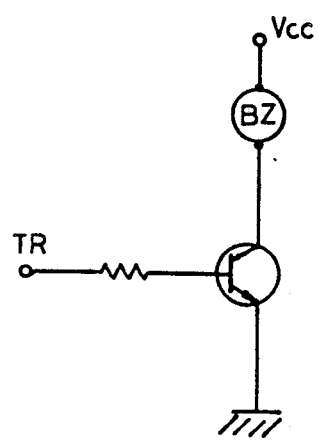
FIG. 6 shows an alarm circuit in accordance with the present invention.

As shown in FIGS. 1, 2, 2a, a block diagram of an overall control system of the present invention is shown, including a driving belt N forming as a loop wound on a driving pulley O and a follower pulley P opposite to the driving pulley O, a first door L1 mounted on an upper belt portion of the driving belt N, a second door L2 mounted on a lower belt portion of the belt N operatively closed or opened in cooperation with the first door L1, a motor M having a motor shaft driving the driving pulley O, and a servo-controlled network including a photo-electric tachosensor circuit A, a pulse shaping circuit B, a frequency voltage transducing circuit G, a voltage comparator and amplifier circuit F, a reference voltage setting circuit E and a power control circuit H.

The most important function of the servo-controlled network of the present invention is to mobilisably adjustably supply a suitable power for driving the motor, depending upon the load variations of the automatic door, regardless of the different instructions of high speed HS, medium speed M, low speed LS and slow speed SL dispatched by the operating modes of the central processing unit. The motor will also be stably driven according to the instructions by the central processing unit. For limiting the reciprocal movements of the two doors L1, 12, two limiting stoppers K are provided for restricting the stroke of the door movement and served for a positioning reference.

In some circumstances, for instance, an environmental variation due to wind resistance and pressure for increasing the load of automatic door, the operating modes especially the slow speed SL running will exert a torque output of the motor less than the torque output by the motor under high speed HS running. The reduced torque of motor can not provide an enough force to close the doors completely. When the wind resistance and pressure is increased, the technician for installing the automatic door may increase the power supply to drive the door running under increased load at slow speed SL state. However, if the factors of weather or environmental changes are dismissed, the adjusted increased output at slow speed state may possibly cause a serious collision of the closing doors or may further mislead the monitoring and control function of the central processing unit.

Since the power is supplied depending upon the capacity of load, other than the running speed, the power can be used with a higher efficiency. Even at slow speed SL running, a torque output of the moor as same as that at high speed HS running will be obtained because the servo-controlled network may automatically adjust the power supply i accordance with the present invention.

The operation procedures and the automatic adjusting and monitoring control modes should be pre-designed, which are prepared a software programs and recorded in the memory device of central processing unit C. The central processing unit C also receives the signals by sensing the motor revolution speed from S3, S4 of pulse shaping circuit B. The signals are sensed from photoelectric tacho-sensor circuit A which is mounted on a rear (or bottom) portion of a motor casing 5 as shown in FIGS. 2, 2a. The photoelectric tacho-sensor circuit A includes a sensing rotation disc 4 secured to a motor shaft 7 as clamped by two round terminals T mounted on the motor shaft 7. Therefore, the motor rotor 6 will synchronously rotate the disc 4. The photo-electric tacho-sensors 1, 2 and the pulse shaping circuit B are welded on a circuit board 3 a shown FIG. 2. The two sensors 1, 2 should have an angle difference for sensing two pulses of equal frequency but with phase difference of ninety degrees for a forward and reverse rotation of motor M from the rotation disc 4 having a plurality of radial stripes formed on the disc 4 with each black stripe 41 being neighboured to each white stripe 42.

The central processing unit C also monitors two signals S3, S4 which are sensed with respect tot the motor speed and are processed for the data of a relationship of pulse phase change, pulse wave width and pulse number to be compared with the data of pre-memorized programs so as to timely output series of control signals, through an output coupling circuit D, to control an operating reference voltage in the reference voltage setting circuit E which reference voltage will be output into the voltage comparator and amplifier circuit F. A running-speed voltage proportional to the motor revolutions as transmited from the frequency voltage transducing circuit G is also input into the comparator and amplifier circuit F which circuit F will compare the reference voltage from the reference voltage setting circuit E with the voltage from the transducing circuit G. After being compared and amplified by the comparator and amplifier circuit F, the voltage value is delivered to the power control circuit H for controlling the motor running in accordance with the instructions ordered by the central processing unit C. Partial output control signals from the central processing unit C are transmitted to the power source supplying circuit I through the output coupling circuit D, which circuit I will timely supply suitable power into the power control circuit H for driving the motor M for opening, closing or braking the doors in accordance with the instruction sequences as controlled by the central processing unit C.

When an abnormal condition such as encountering an obstacle during a normal motor running, the abnormal operating signal as sensed will be compared with the pre-memorized program R in the central processing unit C so as to sound an alarm depending upon a specific abnormal state through an alarm circuit J.

As shown in FIGS. 3–6, a preferred embodiment of the present invention is shown and will be described hereinafter.

Figure 3:
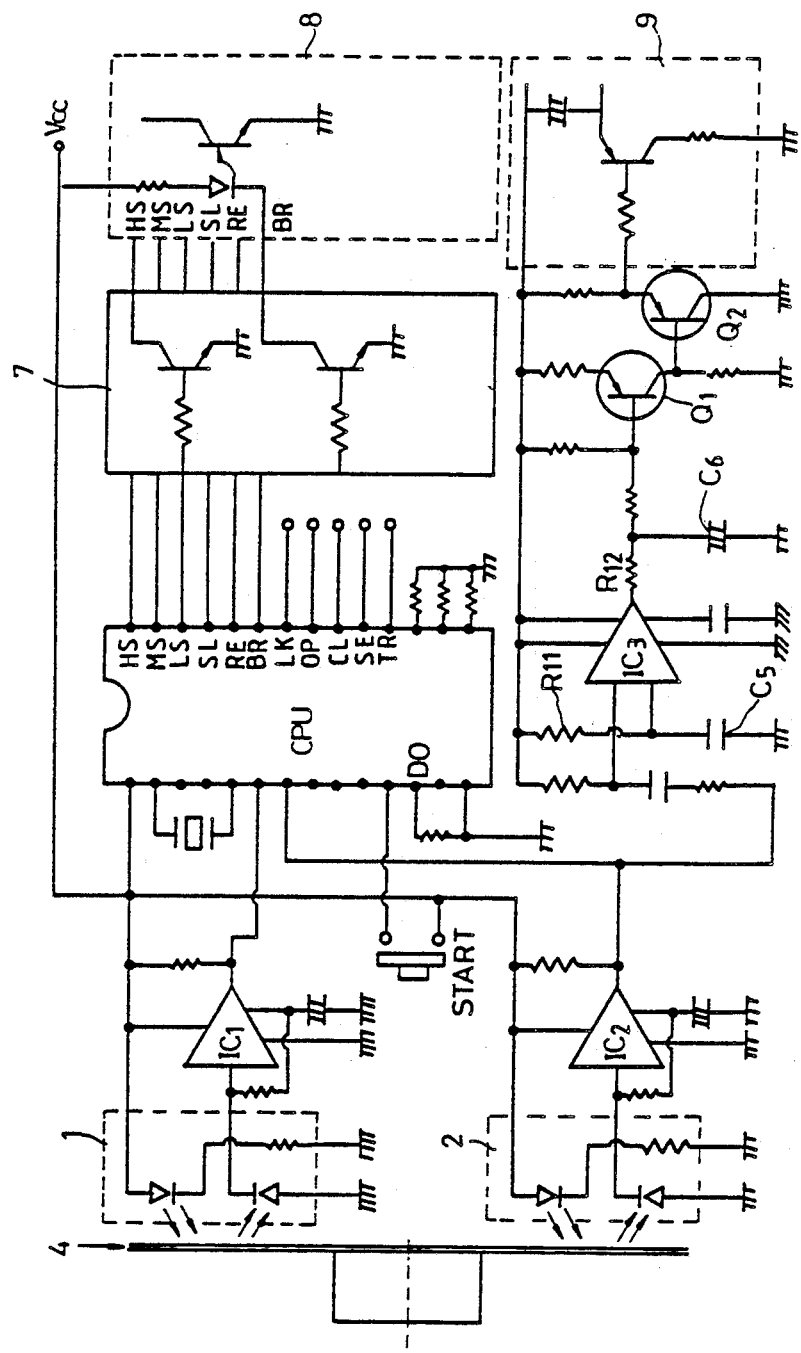
FIG. 3 shows a first control circuit of the present invention.

The photo-electric sensor 1, 2 as shown in FIG. 3 are optical reflective type, which may also be modified as photointerrupters. The pulse frequency as sensed by the photoelectric sensor will depend upon and be proportional to the number of black-and-white stripes 41, 42 formed on the rotating disc 5 and the revolutions per minute (RPM). If the photoelectric sensor is made as photointerrupter, the white stripe 42 on the rotating disc 5 must be made as light transmissive or void space.

There are twelve black stripes and twelve white stripes radially juxtapositionally formed on the rotating disc 4. Upon a rotation of one revolution of the disc 4, each sensor 1, 2 will exert twelve pulses. Each sensor has an angle difference from the other sensor to have a phase difference of ninety degrees of the pulses. If the motor speed is 1800 rpm, the pulse frequency f sensed by the sensor 1, 2 will be calculated as follows:

$$f = (1800/60) \times 12 = 360 \text{ Hz}$$

The two pulses S1, S2 having 90 degrees phase difference are then input into IC1 and IC2 respectively for shaping the pulse waves to produce square waves.

The central processing unit CPU will have output instructions as follows:
HS: Instruction for high speed running
MS: Instruction for medium speed running
LS: instruction for low speed running
SL: Instruction for slow speed running
BR: Braking order
RE: Rapid zero resetting during operation
OP: Instruction for power supply for opening door
CL: For power supply for closing door
SE: For judging whether to start receiving order at "START" terminal by CPU
TR: For alarming signal The output coupling circuit 7 may use transistors to serve as switching means. The frequency-voltage transducing circuit comprises: resistor R11, capacitor C5, IC3, resistor R12, and capacitor C6, in which IC3, R11 and C5 form a monostable multivibrator of which the wave width of the oscillating pulse depends upon the value of R11 and C5. The number of oscillating pulses are synchronized with the pulse frequency in response to motor revolutions output from IC2. Since each pulse output from IC3 will have a same wave width, an integrated circuit of R12 and C6, depending upon the number of pulses from IC3 will produce a direct-current (DC) voltage proportional to the motor revolutions, which DC voltage will be input, through Q1, Q2, into an input terminal of the voltage comparator and amplifier circuit 9 for voltage comparison.

Figure 4:
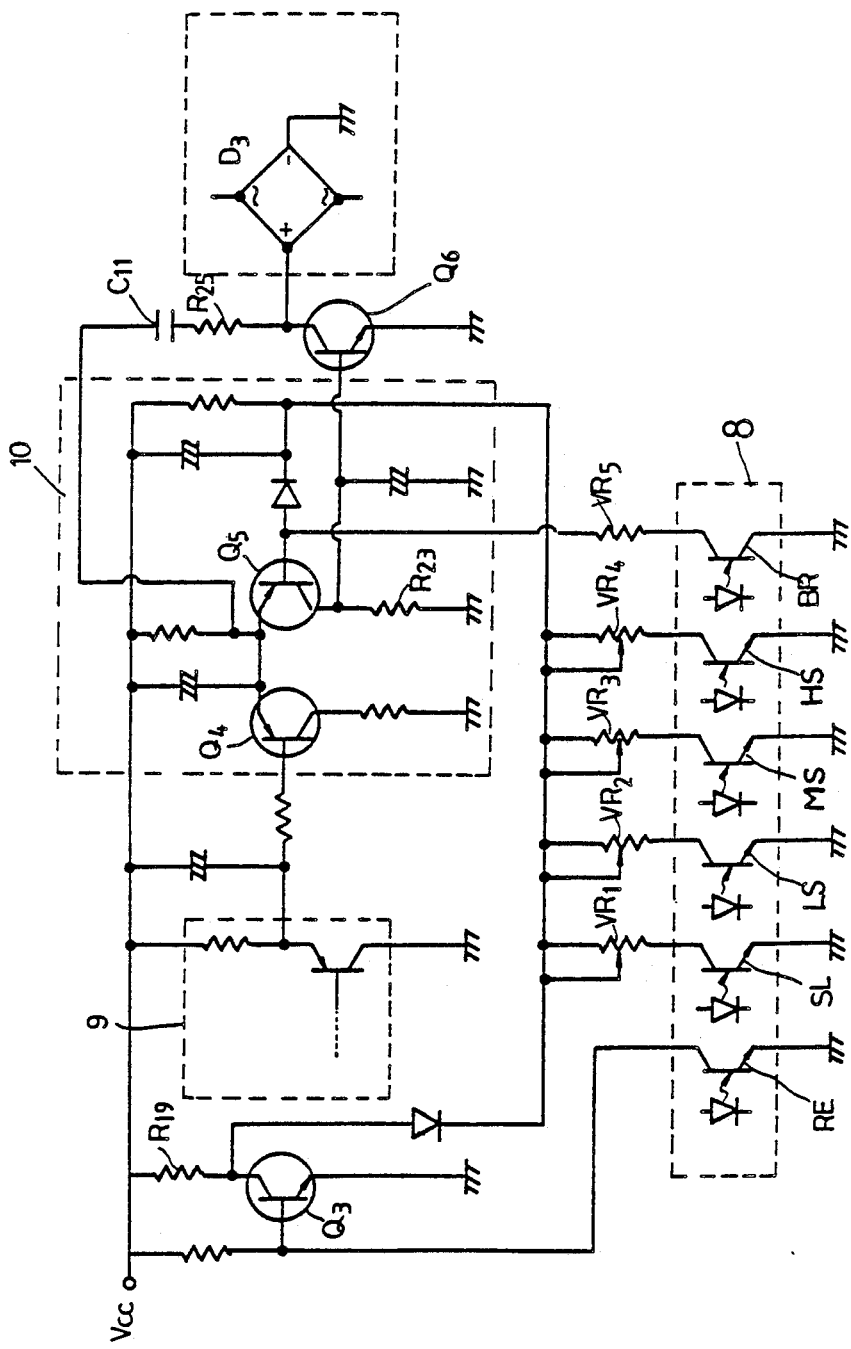
FIG. 4 shows a second control circuit of the present invention.

The photoelectric couplers RE, SL, LS, MS, BR as shown in FIG. 4 are controlled by the switching transistor of output coupling circuit 8 as shown in FIG. 3, in which:

When the photoelectric coupler RE is conducted, a biasing voltage at base of transistor Q3 may be deemed as "zero" and a low resistance of resistor R19 will cause a zero reference voltage of transistor Q5 so as to stop motor running of the automatic door.

Figure 5:
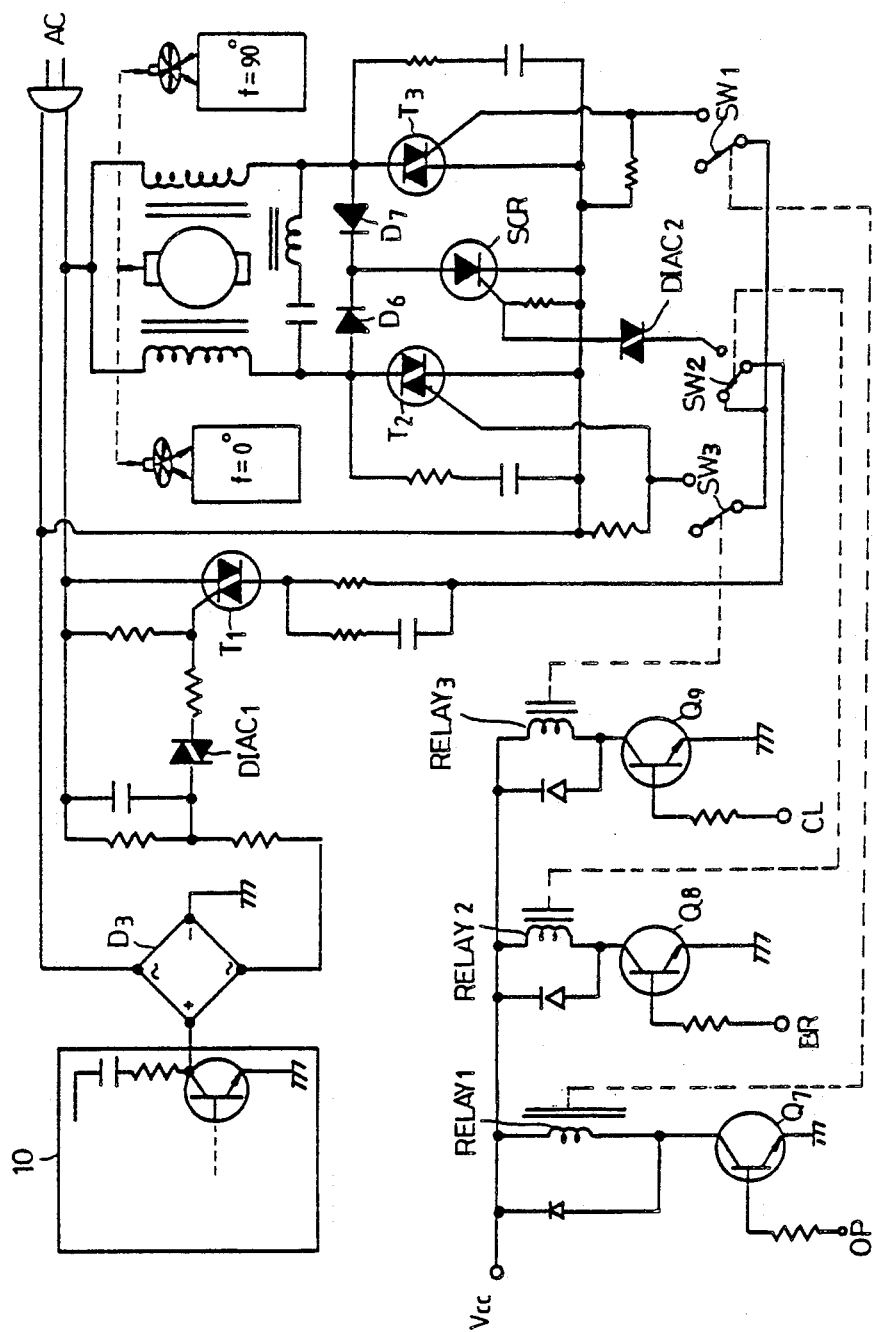
FIG. 5 shows a third control circuit of the present invention.

When the photoelectric couplers SL, LS, MS, HS are respectively conducted, the variable resistors VR1, VR2, VR3, VR4 may be considered as grounded to supply biasing voltage of the PNP transistor Q5, of which the value of biasing voltage of the transistor may set the motor running speed. Q4 and Q5 form the voltage comparator and amplifier circuit 10, in which one terminal receives a mobilizably variated direct-current voltage of motor running speed from the frequency-voltage transducing circuit G, and the other terminal receives a setting voltage from the reference voltage setting circuit E as switched by a transistor and being st for a resistance value. The circuit 10 will compare the two input voltage values, which will then form a mobilizable variated resistor between a collector and an emitter of Q6 as effected by a variation of terminal voltage of the resistor R23 connected to Q5, thereby producing an oscillating signal by a feedback of R25, C11 to an emitter of Q5. The value of the oscillating signal is varied relative to the variation of an internal resistance between the collector and the emitter of Q6. The oscillating signal passes through bridge rectifier D3 to form an oscillating circuit in cooperation with the power source AC for controlling a conducting degree of DIAC1 as shown in FIG. 5. The mobilizably variable oscillating voltage for conducting the DIAC1 will control the conducting degree of TRIAC (T1) which TRIAC T1 will deliver an output to switch SW2 of Relay 2 for actuating a braking circuit through SCR, D6 and D7; or deliver an output to switch SW1 of Relay 1 for conducting TRIAC T3 for opening the door (OP); or deliver an output to switch SW3 of Relay 3 for conducting TRIAC T2 for closing door (CL). The signal OP at Q7, signal BR at Q8 and signal CL at Q9 are all instructed by central processing unit CPU.

The motor M will be operated with suitable running speed or be braked to stop its running depending upon the conducting degree of TRIAC T2, T3 or SCR.

When the motor is running according to a setting speed as set by the reference voltage setting circuit, two sensors as shown in FIG. 5 will monitor the rotating disc 4 mounted on the motor shaft for sensing pulses which will be input into the central processing unit CPU and the frequency voltage transducing circuit of the servo-controlled network for automatically controlling, adjusting, detecting the locations of the automatic doors at the states of opening door or closing door at high speed, medium speed, low speed and slow speed, and for maintaining a stable door operation by means of the servo-controlled network of the present invention.

The alarm circuit J of the present invention is connected to terminal TR of central processing unit CPU, which will be actuated to sound an alarming buzzer BZ upon a receiving of any out-of-order instruction from CPU for early alerting a trouble or obstacle obstructing a normal door operation.

The present invention has the following advantages in comparison with the prior arts of automatic doors.

1. The control modes can be pre-memorized in the central processing unit, a microprocessing software, for substituting a conventional electronic control circuit (hardware) or reducing production cost and minimizing maintenance problems as always incurred in a conventional automatic door system.

2. This invention will automatically adjust its speed-reduction point to locate a slow speed starting point for preventing an accidental door collision due to force of inertia during a door operation.

3. For changing the control or operation method, it is simply done just by changing the software program recorded in the CPU.

4. A conventional servo-controlled protection circuit (hardware) can be eliminated for simplifying the installation engineering and maintenance work of an automatic door system.

The present invention further provides a door start means (START) for controlling an opening or closing operation of the door when receiving a start signal SE from said central processing unit in response to a start signal input therein.

I claim:

1. A microprocessing automatic door comprising:
    a driving motor operatively driving a pair of pulleys of a driving belt wound on the two pulleys, having a first door mounted on an upper loop portion of said driving belt and a second door mounted on a lower loop portion of said belt, both doors operatively closed or opened with each other as driven by said belt;
    a pair of photoelectric tacho-sensor circuits respectively monitoring and sensing a running speed of said motor for detecting a pulse in response to said motor running;
    a servo-controlled network mobilizably automatically adjusting a power supply for driving said motor for stabilizing a running of said motor depending upon a load of the automatic door;
    a central processing unit prerecorded with programs of operating procedures and automatic adjusting, monitoring and control modes of the automatic door in a read only memory of said central processing unit, said central processing unit receiving a pulse signal as sensed by said photo-electric tacho-sensor circuits in response to the running speed of said motor to be compared with the prerecorded programs in said central processing unit for exerting series of control signal or operating instruction which are input into said servo-controlled network for controlling the stable running of said motor in accordance with the instructions from said central processing unit;
    a pair of limiting stoppers formed on two opposite extremities of a reciprocal moving stroke of the doors serving as a positioning reference point of the automatic door; and
    an alarm circuit operatively receiving an out-of-order instruction from said central processing unit for sounding a buzzer for warning purpose,
    the improvement which comprises:
    said servo-controlled network including:
    a pulse shaping circuit receiving and shaping one pulse as sensed by one of said tacho-sensor circuits for producing square waves;
    a frequency-voltage transducing circuit receiving one output signal from said pulse shaping circuit in response of one of the two tacho-sensor circuits for obtaining a voltage value proportional to the motor running speed;
    a voltage comparator and amplifier circuit operatively receiving one voltage value from said frequency-voltage transducing circuit and also receiving a setting voltage value from a reference voltage setting circuit for comparing and amplifying an output voltage; and
    a power control circuit having a transistor of which a biasing voltage is supplied by said output voltage from said comparator and amplifier circuit for variating an internal resistance of said transistor in relation to the load change of the door for changing an oscillating frequency of an oscillator comprised of a resistor and a capacitor for controlling a conducting degree of a thyristor or silicon-controlled rectifier in said power control circuit for an output of mobilisable variating power for stably driving the motor and the door in accordance with an operating instruction ordered by said central processing unit.

* * * * *